United States Patent
Marietta et al.

(10) Patent No.: US 9,442,870 B2
(45) Date of Patent: Sep. 13, 2016

(54) INTERRUPT PRIORITY MANAGEMENT USING PARTITION-BASED PRIORITY BLOCKING PROCESSOR REGISTERS

(75) Inventors: Bryan D. Marietta, Cedar Park, TX (US); Gary L. Whisenhunt, Leander, TX (US); Kumar K. Gala, Austin, TX (US); David B. Kramer, Cedar Park, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 642 days.

(21) Appl. No.: 13/570,843

(22) Filed: Aug. 9, 2012

(65) Prior Publication Data

US 2014/0047149 A1 Feb. 13, 2014

(51) Int. Cl.
| | |
|---|---|
| *G06F 13/26* | (2006.01) |
| *G06F 9/50* | (2006.01) |
| *G06F 13/24* | (2006.01) |
| *G06F 13/14* | (2006.01) |
| *G06F 9/455* | (2006.01) |
| *G06F 9/45* | (2006.01) |

(52) U.S. Cl.
CPC .......... *G06F 13/26* (2013.01); *G06F 9/45533* (2013.01); *G06F 9/5077* (2013.01); *G06F 13/14* (2013.01); *G06F 13/24* (2013.01)

(58) Field of Classification Search
CPC ...... G06F 13/14; G06F 13/24; G06F 9/5077; G06F 9/4553
USPC ........................................................ 710/268
See application file for complete search history.

(56) References Cited

U.S. PATENT DOCUMENTS

| | | | |
|---|---|---|---|
| 4,133,030 A | 1/1979 | Huettner et al. | |
| 5,193,187 A | 3/1993 | Strout et al. | |
| 5,600,805 A | 2/1997 | Fredericks et al. | |
| 5,659,756 A | 8/1997 | Hefferon et al. | |
| 6,598,069 B1 * | 7/2003 | Rooney et al. | 718/104 |
| 6,865,688 B2 | 3/2005 | Dawkins et al. | |
| 7,162,560 B2 | 1/2007 | Taylor et al. | |
| 7,209,994 B1 | 4/2007 | Klaiber et al. | |
| 7,272,664 B2 | 9/2007 | Arimilli et al. | |
| 7,296,133 B2 | 11/2007 | Swanberg | |
| 7,302,511 B2 | 11/2007 | Jeyasingh et al. | |
| 7,533,207 B2 | 5/2009 | Traut et al. | |
| 7,606,995 B2 | 10/2009 | Herrell et al. | |
| 7,617,340 B2 | 11/2009 | Gregg | |
| 7,660,912 B2 | 2/2010 | Gregg | |
| 7,689,747 B2 | 3/2010 | Vega et al. | |
| 7,752,378 B2 * | 7/2010 | Fukumura et al. | 710/317 |
| 7,818,751 B2 | 10/2010 | Togawa | |
| 7,835,356 B2 | 11/2010 | Bar-Kovetz et al. | |
| 7,849,247 B2 | 12/2010 | Marietta et al. | |

(Continued)

OTHER PUBLICATIONS

Freescale Semiconductor, Inc., EREF 2.0: A Programmer's Reference Manual for Freescale Power Architecture® Processors, Rev. 0, Sep. 2011.

(Continued)

*Primary Examiner* — Henry Tsai
*Assistant Examiner* — Christopher A Daley

(57) ABSTRACT

A method and circuit for a data processing system (20) provide a processor-based partitioned priority blocking mechanism by storing priority levels and associated partition information in special purpose registers (27-29) located at the processor core (26) to enable quick and efficient interrupt priority blocking on a partition basis.

20 Claims, 4 Drawing Sheets

(56) References Cited

U.S. PATENT DOCUMENTS

| | | | |
|---|---|---|---|
| 7,849,327 B2 | 12/2010 | Leung et al. | |
| 7,912,062 B2 | 3/2011 | Gulati et al. | |
| 7,987,464 B2 * | 7/2011 | Day et al. | 718/104 |
| 8,041,920 B2 | 10/2011 | Konfaty et al. | |
| 8,108,736 B2 | 1/2012 | Uchibori | |
| 8,131,901 B2 | 3/2012 | Mansell et al. | |
| 8,175,271 B2 | 5/2012 | Belgaied et al. | |
| 8,176,487 B2 | 5/2012 | Armstrong et al. | |
| 8,281,315 B2 * | 10/2012 | Ault et al. | 718/107 |
| 8,453,143 B2 * | 5/2013 | Mahalingam et al. | 718/1 |
| 8,489,789 B2 * | 7/2013 | Serebrin et al. | 710/267 |
| 8,560,782 B2 | 10/2013 | Marietta et al. | |
| 8,589,934 B2 * | 11/2013 | Makljenovic et al. | 718/103 |
| 8,782,314 B2 * | 7/2014 | Kothari et al. | 710/260 |
| 9,229,884 B2 | 1/2016 | Marietta et al. | |
| 2003/0061423 A1 | 3/2003 | Rankin et al. | |
| 2003/0115443 A1 | 6/2003 | Cepulis et al. | |
| 2004/0205272 A1 | 10/2004 | Armstrong | |
| 2004/0215860 A1 * | 10/2004 | Armstrong et al. | 710/260 |
| 2006/0212642 A1 | 9/2006 | Takahashi et al. | |
| 2007/0208885 A1 | 9/2007 | Otsuka | |
| 2008/0126652 A1 * | 5/2008 | Vembu et al. | 710/268 |
| 2008/0141277 A1 * | 6/2008 | Traut et al. | 719/313 |
| 2008/0162734 A1 | 7/2008 | Uehara et al. | |
| 2008/0209182 A1 | 8/2008 | Snyder et al. | |
| 2008/0267193 A1 | 10/2008 | Fought et al. | |
| 2008/0320194 A1 | 12/2008 | Vega et al. | |
| 2008/0320272 A1 * | 12/2008 | Fukumura et al. | 712/13 |
| 2009/0282211 A1 | 11/2009 | Hoover et al. | |
| 2010/0095039 A1 | 4/2010 | Marietta et al. | |
| 2010/0146344 A1 | 6/2010 | Uchibori | |
| 2011/0072220 A1 | 3/2011 | Marietta et al. | |
| 2012/0159245 A1 * | 6/2012 | Brownlow et al. | 714/23 |
| 2013/0326102 A1 | 12/2013 | Marietta et al. | |
| 2014/0047150 A1 | 2/2014 | Marietta et al. | |

OTHER PUBLICATIONS

Non-final office action dated Jul. 29, 2014 in U.S. Appl. No. 13/460,297.
Final office action dated Dec. 4, 2014 in U.S. Appl. No. 13/460,297.
Notice of Allowance dated Oct. 23, 2015 in U.S. Appl. No. 13/460,297.
Non-final office action dated Sep. 8, 2014 in U.S. Appl. No. 13/485,120.
Non-final office action dated Dec. 23, 2014 in U.S. Appl. No. 13/485,120.
Final office action dated Apr. 2, 2015 in U.S. Appl. No. 13/485,120.
Notice of Allowance dated Aug. 12, 2015 in U.S. Appl. No. 13/485,120.
Non-final office action dated Jan. 8, 2015 in U.S. Appl. No. 13/570,874.
Notice of Allowance dated Apr. 15, 2016 in U.S. Appl. No. 13/570,874.
Notice of Allowance dated Jun. 6, 2016 in U.S. Appl. No. 13/570,874.

* cited by examiner

INTERRUPT PRIORITY MANAGEMENT USING PARTITION-BASED PRIORITY BLOCKING PROCESSOR REGISTERS

BACKGROUND OF THE INVENTION

1. Field of the Invention

The present invention is directed in general to data processing systems. In one aspect, the present invention relates to interrupt management in a data processing system that employs more than one partition.

2. Description of the Related Art

In data processing systems, the physical or hardware resources may be divided into resource subsets or logical partitions which virtually operate as a separate computer, where each partition typically contains a processor core and other specified resources or specified portions of a resource such as memory within the system. To manage interrupt processing with existing data processing systems, interrupt controllers include interrupt blocking mechanisms that control interrupt priority blocking based solely on interrupt priority on a per-processor core basis, but this approach creates significant performance issues with partitioned/virtualized machines due to interrupt controller access times and the lack of partition-based blocking. Accordingly, a need exists for an improved system and methodology for managing interrupts in a partitioned data processing system that address various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
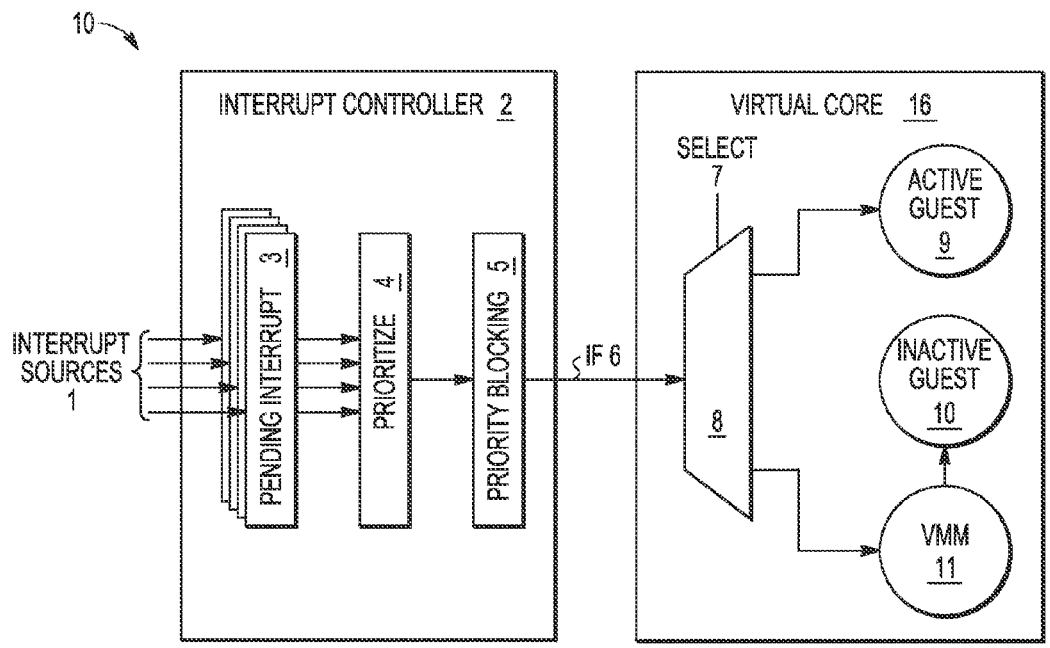
FIG. 1 is a simplified block diagram of a system for managing interrupt requests with an interrupt controller which performs priority blocking using an interrupt priority blocking register at the interrupt controller.

A system, apparatus, and methodology are described for managing partitioned interrupt requests with a processor-based priority blocking mechanism and programming model wherein interrupt priority blocking may be controlled on a partition basis using one or more special purpose priority blocking registers at the processor core. In order to simplify the design of the interrupt controller architecture and to reduce access time and programming complexity associated with changing the blocking conditions at the interrupt controller and performing partition-based priority blocking, a processor core architecture includes one or more processor core registers to control interrupt priority blocking on a partition basis. When an interrupt request is presented to the processor core, a partition identifier (e.g., a Logical Partition Identifier, or LPID) from the interrupt request is compared to select one of the processor core registers. Depending on the selected priority core register, a priority level value from the interrupt request is compared to a priority level stored in the selected processor core register to determine if the interrupt request is blocked or forwarded to the targeted virtual processor (thread). A blocked interrupt sits in the blocked state in the processor core until a higher priority interrupt is presented to the processor core or the priority level in the processor core register(s) is changed, at which time the presented interrupt request may be re-evaluated for forwarding. In selected embodiments, the processor core includes an Interrupt Priority Level Register (INTLEVEL) which is used by software to set and read the interrupt priority level for blocking or accepting external input interrupts directed to the hypervisor at the virtual processor or any guest operating system(s) bound to the virtual processor which are not currently in execution. In addition, the processor core may include a Guest Interrupt Priority Level Register (GINTLEVEL) which is used by software to set and read the interrupt priority level for blocking or accepting external input interrupts directed to any guest operating system(s) bound to the virtual processor which are currently in execution. In operation, the priority level stored in the INTLEVEL register and/or GINTLEVEL register prevents external partitioned interrupts having are a lower or equal priority level from being taken.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

With existing data processing systems, interrupt priority blocking is controlled on a per-processor core basis using interrupt blocking mechanisms located at the interrupt controller. However, there are performance issues associated with accessing or changing the interrupt blocking mechanisms at the interrupt controller which handles interrupt priority on a per-processor core basis. These performance issues can include significant access time penalties when processing interrupt requests with partitioned or virtualized machines, such as interrupt requests targeted for a partition not currently in execution or interrupt requests that are not currently selected by the presentation arbitration for processing by the processor. To illustrate these performance issues, reference is now made to FIG. 1 which depicts a simplified block diagram of an interrupt processing system 10 in which external sources 1 present interrupt requests 3 to the interrupt controller 2 which prioritizes and masks the outstanding interrupt requests 1 for presentation to a virtual core 16 for servicing. As depicted, the interrupt controller 2 receives and stores all pending interrupt requests at storage devices 3. The pending interrupts are then prioritized at the arbitration circuit or module 4 to generate prioritized interrupt requests. Next, priority blocking is performed on the prioritized interrupt requests using an interrupt priority blocking register 5 at the interrupt controller 2. If a pending interrupt request from a source has the highest priority (as determined at the arbitration circuit or module 4) and is higher priority than the blocking condition (as determined at the interrupt priority blocking register 5), it is sent to the targeted virtual core 16 over one or more interface signal lines 6. At the targeted virtual core 16, any interrupt request must be routed to the appropriate partition (e.g., the virtual machine manager (VMM) 11 or a guest operating system 10, 11), such as by using a multiplex routing circuit 8 controlled by a software-based select signal 7. If the presented interrupt request is directed to the VMM 11 or the active guest operating system (OS) 9, the interrupt request can be serviced immediately. Alternatively, if the presented interrupt request is directed to an inactive guest OS 10, the VMM 11 may initiate a partition switch to the partition associated with the interrupt request, and then inform the interrupt controller 2 on each partition switch for each virtual processor in the partition.

As seen from the foregoing, the location of the interrupt priority blocking register 5 at the interrupt controller 2 creates a number of performance problems. For example, any change in the priority blocking conditions stored at the interrupt controller 2 must be managed completely through software using the VMM, which adds delay, overhead, and complexity that can adversely affect system performance. The additional overhead and complexity is especially significant in a partitioned machine where the VMM 11 or active guest 9 must process an interrupt request that has no associated partition information and is targeted to a partition that is not currently in execution (e.g., inactive guest OS 10). In cases where the VMM 11 must take every interrupt, interrupt response time can be very poor.

Figure 2:
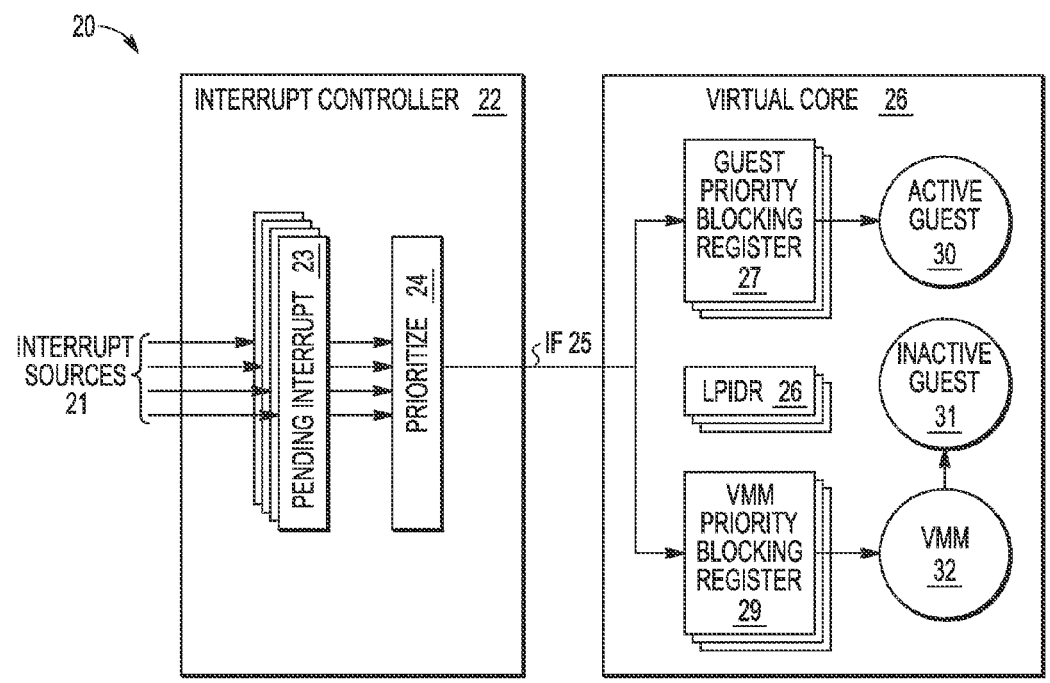
FIG. 2 is a simplified block diagram of a system for managing interrupt requests using special purpose interrupt priority blocking registers at the virtual core to perform partition-based priority blocking in accordance with selected embodiments of the present invention.

To reduce the software overhead and complexity for interrupt management and/or partition management, a partitioned priority blocking mechanism is provided at the virtual core for quickly and efficiently performing priority blocking at the targeted processor. To illustrate selected embodiments, reference is now made to FIG. 2 which depicts a simplified block diagram of an interrupt processing system 20 in which external sources 21 present interrupt requests 23 to the interrupt controller 22. Using the arbitration circuit or module 24, the outstanding interrupt requests 21 are prioritized for presentation to a virtual core 26 over one or more interface signal lines 25. Because there are no blocking conditions at the interrupt controller 22, the design and operation of the interrupt controller 22 may be simplified since there is no blocking logic and the active partition does not need to be known by the interrupt controller 22.

The virtual core 26 manages interrupt request processing using special purpose interrupt priority blocking registers 27-29 located at the virtual core 26 to perform partition-based priority blocking for one or more partitions 30-32 residing at the targeted virtual core 26. By simultaneously applying the delivered interrupt request to local interrupt priority blocking registers 27-29 associated with different partitions, different partitions can quickly and efficiently control interrupt blocking conditions independently from one another. If a pending interrupt request from a source has the highest priority (as determined at the arbitration circuit or module 24) and is higher priority than the blocking condition specified for a given partition (as determined at the interrupt priority blocking register 27, 29), it is sent to the appropriate partition (e.g., active guest OS 30 or VMM 32) at the targeted virtual core 26. In this way, an interrupt request directed to the VMM 32 (as determined by a partition identifier included with the interrupt priority request) and having a higher priority than the blocking condition for that partition (as determined by the VMM priority blocking register 29) can be serviced immediately by the VMM 32. However, if the interrupt request directed to the VMM 32 has a priority that does not meet the blocking condition for that partition (as determined by the VMM priority blocking register 29), then the interrupt request is blocked. In similar fashion, if the presented interrupt request is directed to an inactive guest OS 31, the VMM 32 may initiate a partition switch to the partition associated with the interrupt request without requiring any control signaling to the interrupt controller 22, provided that the interrupt request has a priority that is higher than the blocking condition for that partition specified in the VMM priority blocking register 29. Finally, a presented interrupt request that is directed to an active guest OS 30 may be serviced immediately by the active guest OS 30, provided that the interrupt request has a priority that is higher than the blocking condition for that partition specified in the guest priority blocking register 27. Since local interrupt priority blocking registers 27, 29 are located and partitioned at the virtual core 26 as separate special purpose registers, an active guest partition 30 can quickly and efficiently control blocking conditions specified in the guest priority blocking register 27 independently from the VMM 32 and without VMM intervention. An additional advantage of using local interrupt priority blocking registers 27, 29 at the virtual core 26 is that partition switches do not require reconfiguration of the interrupt controller 22.

Figure 3:
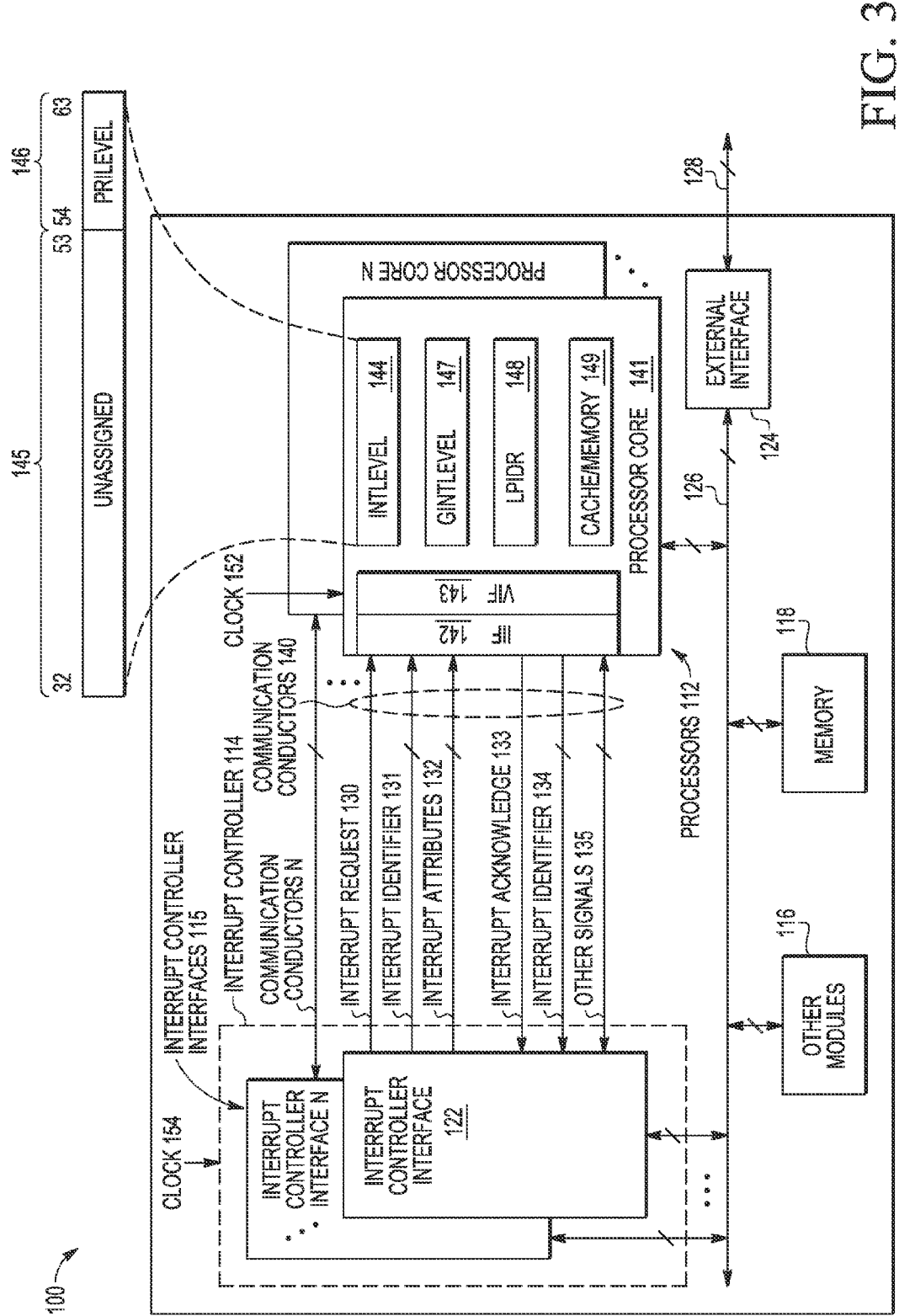
FIG. 3 is a simplified block diagram of a system for managing physical interrupt requests with a hardware managed interrupt service structure wherein special purpose registers at the processor core are used to control interrupt priority blocking on a partition basis in accordance with selected embodiments of the present invention.

To illustrate additional embodiments, reference is now made to FIG. 3 which depicts a simplified block diagram of a data processing system 100 for managing physical interrupt requests with an interrupt service structure wherein special purpose registers at a processor core (e.g., 141) are used to control interrupt priority blocking on a partition basis. The depicted data processing system 100 includes one of more processors 112 connected to an interrupt controller 114 over a plurality of communication conductors 140. In addition, an interconnect circuit, bus or other connectivity mechanism 126 provides a memory-mapped interface for connecting the processor(s) 112 to the interrupt controller 114, one or more other modules 116, one or more memories 118, and external interfaces 124. Clock signals 154, 152 are provided, respectively, to the interrupt controller 114 and processor(s) 112 which may have either an arbitrary phase and frequency relationship, or a known or predetermined relationship, with one another. Though illustrated as being formed on a single integrated circuit, the data processing system 100 may be provided on a plurality of integrated circuits.

In the data processing system 100, the processor(s) 112 include N processor cores (including processor core 141 and processor core N) that are directly connected over N communication conductors (including communication conductors 140) to N interrupt controller interfaces 115 (including interrupt controller interface 122 and interrupt controller interface N) in the interrupt controller 114, where N is an integer greater than or equal to one. In embodiments where the data processing system 100 is partitioned, different physical hardware resources (e.g., processors, controllers, and memory) are grouped together in a "partition" to perform a specified function (such as executing an operating system). In embodiments where the data processing system 100 supports virtualization, one or more of the hardware resources (e.g., a processor or core) may be emulated or abstracted with a software implementation that is executed on a single hardware platform (e.g., a physical processor) to behave like the emulated hardware resource (e.g., a virtual processor or virtual core). With virtualization, a physical "processor" (e.g. a physical entity with physical pins to receive the interrupt signals) executes programming code to emulate a "virtual processor" (e.g., a thread of execution within the physical processor) which cannot tell that it is running on multi-threaded processor using shared resources and behaves as it is a physical processor. Thus, virtualization allows the simultaneous execution of several (different) operating systems on a single hardware platform, such as by using a hypervisor operating system abstract or emulate the hardware so that several operating systems can run on the same physical system by providing the guest operating system with virtualized hardware. For example, in embodiments where a processor core implements multithreading, each hardware thread having a thread private architecture state may be considered to be a virtual processor core N. Using virtualization, the data processing system 100 can be organized into one or more logical partitions to represent a collection of actual or emulated hardware resources so that a single virtual computing machine runs on a single logical partition. Within each logical partition, there may be a shared or private memory, one or more processors and a collection of accelerators and I/O devices. Each of these resources, including the processors, may be actual dedicated hardware or may be implemented by partially or completely virtualized hardware.

As shown in FIG. 3, each of the N interrupt controller interfaces 115 is coupled to a corresponding one of the processors 112 by way of one or more communication conductors (e.g. communication conductor 140). In addition, both the processor(s) 112 and N interrupt controller interfaces 115 are bi-directionally coupled to the bus 126. As for the other modules 116, these may include any type of circuitry, such as, for example, timers, drivers, communication ports, etc. Similarly, memory 118 may include any type of memory, such as, for example, random access memory, read only memory, various types of non-volatile memory, etc. Finally, the external interfaces 124 connects the bus 126 to one or more external interrupt sources by way of one or more terminals or conductors 128.

The depicted communication conductors 140 include an interrupt request indicator 130, an interrupt identifier 131, and an interrupt attributes indicator 132 which are provided by the interrupt controller interface 122 to processor core 141. In this way, an interrupt request indication 130 is accompanied by additional associated information which may be defined by software during configuration of interrupts and/or by the hardware and used to process the interrupt request. The associated information may include a hypervisor configured logical partition ID (LPID) value and priority level value associated with the interrupt that is conveyed with the interrupt identifier 131 and/or interrupt identifier 132. In addition, the depicted communication conductors 140 may include an interrupt acknowledge 133 and interrupt identifier 134. The communication conductors 140 may also include one or more other signals 135 which may be bidirectional, which may be uni-directional from interrupt controller interface 122 to processor core 141, or which may be uni-directional from processor core 141 to interrupt controller interface 122. As will be appreciated, the signaling information provided by conductors 130-132 may be provided by way of any one or more separate or shared conductors, and the information provided by conductors 133-134 may be provided by way of any one or more separate or shared conductors.

In operation, the interrupt controller 114 presents prioritized physical interrupts to the processor core 141 by sending an interrupt request 130 along with a corresponding interrupt identifier 131 and corresponding interrupt attributes 132 to the processor core 141. Sorting circuitry (not shown) at the interrupt controller 114 sorts the pending interrupt requests for a particular target processor so that only the top or highest priority interrupt request 130 is presented or asserted to the target processor. Upon accepting the interrupt, the processor 141 returns an interrupt acknowledge 133 to the interrupt controller 114, along with the same interrupt identifier 134.

To support partitioned interrupt processing, the processor 141 includes an interrupt interface (IIF) 142 whereby a global interrupt controller (interrupt controller 114) communicates with the processor 141 which may be a virtual processor or an actual, physical processor. In addition, a virtualized interface (VIF) 143 is provided as a hardware and/or software interface between the (virtual) processor and IIF 142. The interrupt interface 142 coordinates interrupt processing between the (virtual) processor 141 and the interrupt controller 114. With this arrangement, when the interrupt controller 114 sends the highest priority interrupt for a (virtual) processor, the VIF 143 conveys the interrupt to the (virtual) processor which decides whether to take the interrupt. With virtualized interrupts, the processor 141 can begin servicing the interrupt without having to perform memory mapped operations (e.g., over the interconnect circuit or bus 126) to the interrupt controller 114, thereby reducing overhead and latency. Interrupt virtualization also allows interrupts to be targeted to the guest OS currently in execution, the hypervisor, or any guest OSes currently bound to the (virtual) processor which are not currently in execution. In this context, it is understood that a hypervisor (a.k.a., a virtual machine manager (VMM)) refers to a hardware virtualization technique which allows one or more operating systems, termed guests, to run concurrently on a host computer.

In order to control interrupt priority blocking on a partition basis, the processor core 141 includes special purpose registers 144, 147, 148 which are used to store partition identifier and priority level information for one or more partitions resident at the processor core 141. In particular, logical partition identifier (LPID) values for each partition residing at a processor core 141 may be stored in one or more logical partition identifier registers (LPIDR) 148 as hypervisor-privileged registers. At the processor 141, the LPID received with the interrupt is compared to the LPIDR register 148 to determine whether this is a hypervisor interrupt, a guest in execution interrupt, or a guest not in execution interrupt.

In addition, priority level (PRILEVEL) values for selected partitions residing at a processor core 141 (e.g., the hypervisor or inactive guest OS partition) may be stored in one or more interrupt priority level registers (INTLEVEL) 144 which each are defined to include an unassigned field 145 and a priority level field 146. In the depicted example definition of the interrupt priority level register 144, the priority level field 146 includes predetermined bit positions (e.g., bits 54-63) which allow the priority levels associated with an interrupt request to range from 1 to 1023, and the remaining bit positions (e.g., bits 32-53) are allocated to the unassigned field 145. A priority level of 0 allows all interrupts with an LPID not equal to LPIDR (all interrupts not directed to the active guest) to be taken. Correspondingly, a priority level of all ones (1023) blocks all interrupts. While the processor core 141 may implement fewer bits in the priority level field 146 in a right justified manner, the number of bits implemented should be equal to or greater than the number of priority bits implemented in the interrupt controller 114. In operation, the INTLEVEL register 144 may be used by software to set and read the interrupt priority level of external input interrupts at the virtual processor 141 to prevent external input interrupts which have an LPID value not equal to the value in the LPIDR 148 which are a lower or equal to the stored priority level PRILEVEL from being taken.

If separate priority blocking is required for the other partition residing at the processor core 141 (the active guest OS partition), then an additional guest interrupt priority level register (e.g., GINTLEVEL) 147 may be included at the processor core 141. As will be appreciated, the guest interrupt priority level register 147 may be defined to include a priority level field having any desired number of bits (e.g. 10 bits) and corresponding priority levels (e.g., ranging from 1 to 1023). In operation, the GINTLEVEL register 147 may be used by software to set and read the interrupt priority level of external input interrupts at the virtual processor 141 to prevent external input interrupts which have an LPID value equal to the value in the LPIDR 148 which are a lower or equal to the stored priority level PRILEVEL from being taken. [FIG. 3 shows multiple INTLEVEL, GINTLEVEL, and LPIDR registers. I don't think this possible in a real system since we already define per-virtual core interrupt delivery support. Need to discuss with Gary.]

In order to use the partition identifier and priority level information stored in the special purpose registers 144, 147, 148, the instruction set architecture for the processor 141 may include one or more special processor executable instructions that may be retrieved from memory (e.g., memory 118) or local processor storage 149 (e.g., cache memory, EEPROM, flash memory. ROM, MRAM, etc.) and executed to retrieve the stored partition identifier and priority level information for comparison (e.g., at a hardware comparator) with partition identifier and priority level information conveyed with the interrupt request. With this configuration, an interrupt that is presented to the processor core 141 is processed to compare the logical partition ID (LPID) value and priority level value conveyed with the interrupt request to priority level values (PRILEVEL) stored the normal and guest priority registers 144, 147. Depending on the LPID value and priority level comparison result, the interrupt request is blocked or forwarded to the targeted virtual processor thread. A blocked interrupt sits in the blocked state in the processor core 141 until a higher priority interrupt is presented to the processor core 141, or the value in the priority register(s) 144, 147 is changed, at which time the presented interrupt is re-evaluated for forwarding.

The processor 141 uses the special processor executable instructions to handle one or more states for the partitioned interrupts to perform runtime interrupt management (e.g., standard run-time operations associated with interrupts for hypervisors, guests in execution, and guests not in execution) with minimal memory mapped interactions with an external interrupt controller, reducing overhead and latency. In handling the interrupt states for a received interrupt request, the processor 141 uses information associated with the interrupt request which may be defined by software during configuration of interrupts and/or by the hardware and used to process the interrupt request. The associated information may include a hypervisor configured logical partition ID (LPID) value and a priority level (PRILEVEL) value associated with the interrupt that is conveyed with the interrupt identifier 131. At the processor 141, the LPID received with the interrupt is compared to the LPIDR register 148 to determine whether this is a hypervisor interrupt, a guest in execution interrupt, or a guest not in execution interrupt. Depending on the type of interrupt identified by the LPID value, the priority level received with the interrupt is compared to the INTLEVEL register 144 or the GINTLEVEL register 147 to determine whether the interrupt request should be accepted or blocked.

In specifying partition and priority level information for access requests, the SPRs 144, 147-148 may be used to process requests received from the interrupt controller 114 on a partition basis. In particular, when the LPID value associated with the requested interrupt 130 is equal to the contents of the LPIDR register 148, the processor 141 takes the interrupt as a guest OS interrupt for the current partition in execution. But in cases where the LPID value associated with the interrupt is not equal to the contents of the LPIDR register 148, the requested interrupt 130 may be processed as a guest OS interrupt for a partition that is bound to the (virtual) processor 141, but that is not in execution. In addition, the requested interrupt 130 may be a hypervisor interrupt which is not associated directly with a partition. Once the partition associated with a requested interrupt 130 is determined, the SPRs 147-148 may be used to handle interrupt requests by performing interrupt priority level blocking depending on whether the interrupt requests are associated with the current guest OS in execution or are associated with either the hypervisor or a guest OS not in execution but bound to this virtual processor.

Figure 4:
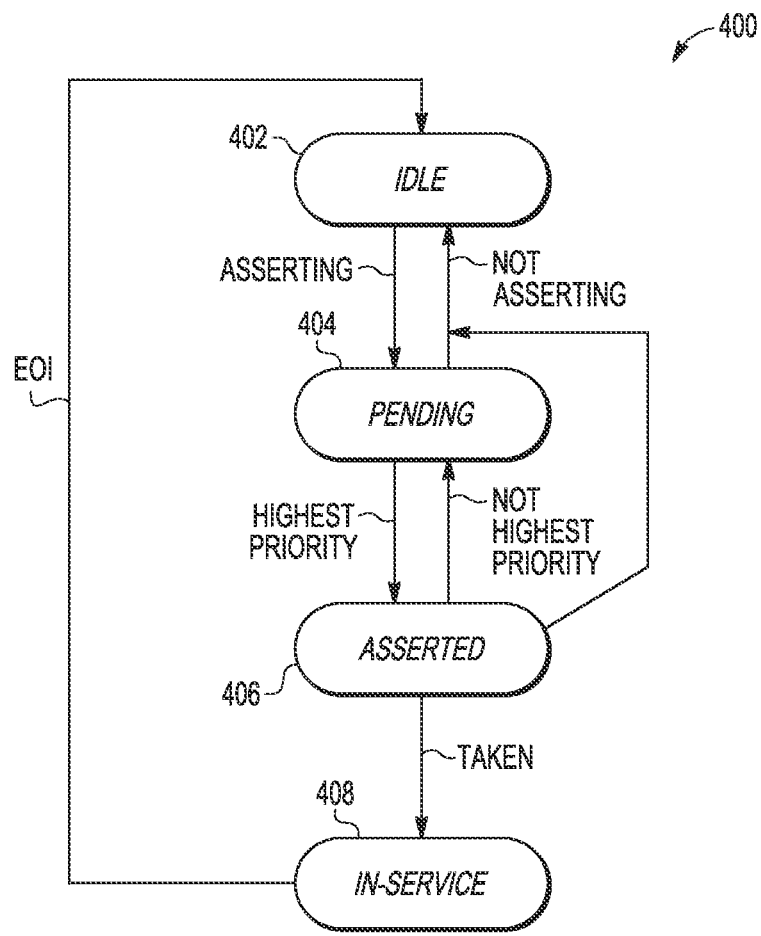
FIG. 4 is a state diagram illustrating the handling of an interrupt request in accordance with selected embodiments of the present invention.

To illustrate the normal operation interrupt states for an interrupt request, reference is now made to FIG. 4 which shows a state diagram 400 illustrating the basic handling of an interrupt request by the processor 141. Normal-operation encompasses the standard run-time operations associated with interrupts for hypervisors, guests in execution, and inactive guests not in execution. As will be appreciated, inactive guests do not perform normal-operation on interrupts since the partition and associated software is not in execution, but for the purposes of this definition, such normal-operation consists of taking interrupts for guests not in service in the hypervisor which will then defer the interrupt or initiate a partition switch to the partition associated with the interrupt, and reflect the interrupt to that partition.

In an initial "idle" state 402, the interrupt is idle and is not currently asserting. Once the source of an interrupt has requested an interrupt, the interrupt moves to the "pending"

state 404 over the "asserting" transition. In the "pending" state 404, the interrupt is processed at the interrupt controller (e.g., interrupt controller 114) and contends with all other interrupts bound to the same (virtual) processor to be selected as the highest priority interrupt. Conversely, once the interrupt is no longer asserting (e.g., when the source of the interrupt has withdrawn its request for an interrupt), the interrupt state returns to the "idle" state 402 over the "not asserting" transition.

If the interrupt has the highest priority, it moves to the "asserted" state 406 over the "highest priority" transition. At the "asserted" state 406, the interrupt is sent from the interrupt controller to the processor as the current highest priority interrupt. Conversely, once the interrupt is no longer the highest priority asserting interrupt at the (virtual) processor, the interrupt state returns to the "pending" state 404 over the "not highest priority" transition. If the interrupt is no longer asserting because the interrupt request was withdrawn, the interrupt state returns to the "idle" state 402 over the "not asserting" transition.

Once the processor takes the interrupt that is not blocked, the processor may update one or more special purpose registers with tag and attribute information for the interrupt, and may send an interrupt acknowledge (IACK) to indicate the presented interrupt was accepted by the virtual processor for processing. The acknowledged interrupt source is no longer eligible for selection for presentation until the interrupt servicing has been completed. Conversely, a blocked interrupt cannot be taken and is not acknowledged. Once acknowledged, an unblocked interrupt enters the "in-service" state 408 over the "taken" transition. During the "in-service" stage, the interrupt request and associated attributes are delivered to a virtual processor which begins executing the external interrupt, and information about the interrupt is used to determine whether the interrupt is taken in the guest state or the hypervisor state. When the execution of the interrupt is completed, an end-of-interrupt command may be performed when the processor executes an interrupt control instruction to write the EOI command with the associated interrupt tag and LPID value to the interrupt controller. As a result, the interrupt returns to the "idle" state 402 from the "in-service" state 408 over the end-of-interrupt "EOI" transition.

Figure 5:
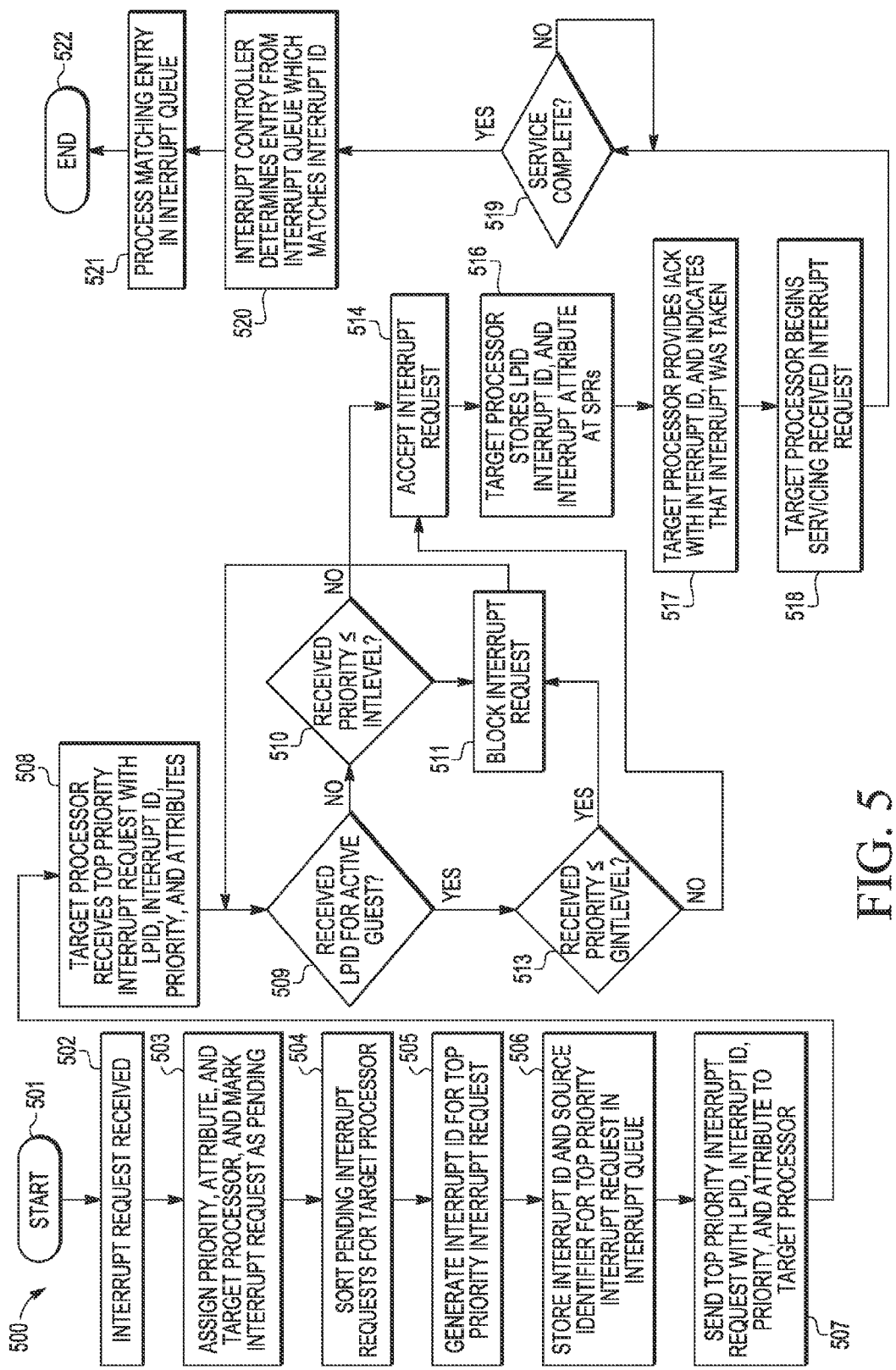
FIG. 5 depicts an example flow diagram according to a method for processing an interrupt request at an interrupt controller and target processor in accordance with selected embodiments of the present invention.

Referring now to FIG. 5, there is depicted an example flow diagram 500 of a method for processing an interrupt at a partitioned interrupt controller and target processor in accordance with selected interrupt controller embodiments of the present invention. Once the method starts at step 501, an interrupt request is received at step 502. The interrupt request may be received from one or more interrupt sources coupled to an interrupt controller, where the interrupt sources may be internal or external to the data processing system.

At step 503, the interrupt controller responds to a received interrupt request by assigning interrupt controller information to the interrupt request and marking the interrupt request state as "pending." The assigned interrupt controller information may include an interrupt priority value, various interrupt attributes, and interrupt source identifier, along with the target processor and any state information associated with the interrupt request. The state information may include one or more indicators to indicate various states of the interrupt (e.g., pending, asserted, in service, invalid, etc.). In addition, partition information (e.g., LPID) is assigned or associated with each interrupt request. As will be appreciated, each interrupt source may be assigned a corresponding priority, attributes, partition, and target processor, though different interrupt sources may share a same priority, attributes, partition, and/or target processor (which refers to the processor that is intended to service the interrupt).

At step 504, the pending interrupt requests for each target processor are sorted. The interrupt controller may include sorting circuitry for determining which processor is the target processor for the interrupt request and sorting the interrupt requests for each target processor. The interrupt requests may be sorted by way of priority, age, interrupt type, etc., or any combination thereof. By implementing partitioned priority blocking at the target virtual core, the interrupt controller does not perform priority blocking and does not need to know the active partition for prioritized interrupt requests, thereby simplifying the design and operation of the interrupt controller.

At step 505, an interrupt identifier, or ID, corresponding to the top interrupt request is generated. The interrupt identifier or tag may be generated in any desired manner, and can be any value that uniquely identifies the interrupt request. Once the interrupt associated with a corresponding interrupt identifier has been serviced, the value of that interrupt identifier can be used again for a new and completely unrelated interrupt, if desired. The value of the interrupt identifier may have a particular significance (e.g., interrupt source number, etc.) or may be unrelated to the interrupt itself.

At step 506, the interrupt ID for the top priority interrupt request is sent to an outstanding interrupt request queue or similar structure to be remembered along with the interrupt source identifier. In addition, the top priority interrupt request is sent to the target processor at step 507, along with the associated partition ID (LPID), interrupt ID, interrupt priority, and interrupt attributes. In the example shown in FIG. 3, the interrupt controller 114 provides the top priority interrupt request through the interrupt request 130, the interrupt identifier 131, and interrupt attributes 312 to processor 141. Other embodiments may provide this information using any desired and appropriate signaling scheme (e.g., some of this information may be provided serially, in parallel, may be time multiplexed, etc.).

Once an interrupt request and associated LPID, interrupt ID, interrupt priority, and attributes are received at the target processor as an interrupt package (step 508), the processor determines whether or not to accept the received interrupt request at steps 509-514. Any desired criteria may be used to determine whether or not to accept the received interrupt request. For example, software and/or hardware masking of interrupts may be used in the processor. In addition or in the alternative, the decision to accept or reject an interrupt may be deferred or suspended until there is a change in one or more mask values to allow acceptance of the interrupt, or until a new interrupt request is received. If an original interrupt request has not yet been accepted when a new interrupt request is received, then the processor will reject the original interrupt request in favor of the new interrupt request since a new interrupt request will only be sent to the processor if that new interrupt request was determined by sorting circuitry to be of higher priority.

In an example methodology, the processor determines whether or not to accept the received interrupt request by first comparing the interrupt package to the processor's internal interrupt state values stored at the SPRs at step 509. If the received LPID matches the guest LPID for the active guest (affirmative outcome to detection step 509), this indicates that the interrupt is for the active guest. In this case, the processor determines if the received priority value is less than or equal to the current priority level value stored in the guest priority blocking register (e.g., GINTLEVEL register) at step 513. If the received priority value is greater than the corresponding active guest's current priority level value (negative outcome to detection step 513), the interrupt request is signaled to the virtual processor which accepts the interrupt request at step 514. However, if the received priority value is less than or equal to the corresponding active guest's current priority level value (affirmative outcome to detection step 513), the interrupt request is blocked at step 511, in which case the interrupt request is not signaled to the virtual processor and it is ignored until it is replaced by the interrupt controller with a higher priority interrupt or software changes the current priority level value stored in the corresponding active guest's priority blocking register (e.g., GINTLEVEL) such that the interrupt can be signaled to the virtual processor.

Referring back to step 509, if the received LPID does not match the LPID for the active guest (negative outcome to detection step 509), then the interrupt is directed to the hypervisor by default. In this case, the processor then determines if the received priority value is less than or equal to the current priority level value stored in the hypervisor's priority blocking register (e.g., INTLEVEL register) at step 510. If the received priority value is greater than the hypervisor's current priority level value (negative outcome to detection step 510), the interrupt request is signaled to the virtual processor which accepts the interrupt request at step 514. However, if the received priority value is less than or equal to the hypervisor's current priority level value (affirmative outcome to detection step 510), the interrupt request is blocked at step 511, in which case the interrupt request is not signaled to the virtual processor and it is ignored until it is replaced by the interrupt controller with a higher priority interrupt or software changes the current priority level value stored in the hypervisor's priority blocking register (e.g., INTLEVEL) such that the interrupt can be signaled to the virtual processor.

As indicated at step 511, any blocked interrupt is stalled until it is replaced by a higher priority interrupt or the blocking condition goes away by writing a lower priority (G)INTLEVEL value. In effect, the flow diagram method loops back to the input to step 509.

If the interrupt request is accepted by the target processor at step 514, the target processor stores the partition ID (LPID), interrupt ID, and interrupt attributes in memory (e.g., special purpose registers) for further processing at step 516. In particular, the received partition ID (LPID) may be stored and compared with the LPID value stored in LPID register (LPIDR) for purposes of steering the interrupt request to the guest or hypervisor, and the interrupt ID and interrupt attributes may be stored for use in processing the interrupt request. At step 517, the target processor provides an interrupt acknowledge (IACK) with the interrupt identifier back to the interrupt controller to indicate that the interrupt was taken, indicating that the taken interrupt is guaranteed to be handled by the processor and can be put in the "in-service" state. At step 518, the target processor begins servicing the received interrupt request. As will be appreciated, the servicing of an interrupt request may be performed in any desired and appropriate manner. The interrupt is then either serviced or deferred at step 519. If deferred, software may change the corresponding current priority register to the received priority value to block additional interrupts of that priority. Once servicing is complete (affirmative outcome to step 519), the processor issues an EOI command with the interrupt identifier, and the interrupt controller uses the interrupt identifier to select the corresponding entry in the outstanding interrupt request queue and then updates the state information for the corresponding interrupt source identifier to change the state of the interrupt request from the "in-service" to the "idle" state at steps 520-521 before the sequence ends (at step 522).

As will be appreciated, the processor-based partitioned priority blocking mechanism and programming model disclosed herein provide a quick and efficient mechanism for managing interrupt priority blocking on a partition basis using special purpose registers at the processor core. In selected embodiments, the partitioned priority blocking mechanism may be embodied in hardware, in processing circuitry for executing software (e.g., including but is not limited to firmware, resident software, microcode, etc.), or in some combination thereof. As used herein, the term software refers to a collection of computer programs, procedures, and/or algorithms (along with related data) which provide instructions to control the function and/or operation of a computer or data processing system. Furthermore, the processor-based partitioned priority blocking mechanism may be embodied as a computer program product accessible from a computer-usable or computer-readable medium providing program code for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. In addition, the non-transitory computer readable storage medium described herein may store special processor executable instructions which, upon execution, causes the processor to compare partition and priority level information from a received interrupt request with information stored in special purpose registers to determine if the interrupt request is blocked or forwarded to the targeted virtual processor.

By now it should be appreciated that there has been provided a circuit, method and system for managing interrupts at a processor using partition-based priority blocking, where the interrupts may be received from one or more virtualized hardware resources. In selected embodiments, the partition-based priority blocking is applied to a first physical interrupt request which is received at a processor as an interrupt package that includes a first priority value and a first partition identifier identifying a first partition. The interrupt package is processed against one or more partitions (e.g., VMM, guest) running on one or more targeted virtual processors at the processor by comparing the first priority value and first partition identifier from the interrupt package against at least a stored priority level (PRILEVEL) and stored partition identifier (LPID) retrieved from one or more special purpose registers (INTLEVEL, GINLEVEL, LPIDR) at the processor to determine on a partition basis if the first physical interrupt request is blocked or forwarded to a targeted virtual processor. In embodiments where the special purpose registers include a first hardware register at the processor for storing a partition identifier (LPID) corresponding to a trusted hypervisor running on the processor and a second hardware priority blocking register for storing a stored priority level corresponding to the trusted hypervisor, the interrupt package may be processed to block the first physical interrupt request if the first partition identifier does not match the stored partition identifier retrieved from the first hardware register and the first priority value does not exceed the stored priority level retrieved from the second hardware register. Alternatively, the interrupt package may be processed to signal the first physical interrupt request to the targeted virtual processor if the first partition identifier does not match the stored partition identifier retrieved from the first hardware register and the first priority value exceeds the stored priority level retrieved from the second hardware register. In other embodiments where the special purpose registers include a first hardware register at the processor for storing a partition identifier (LPID) corresponding to an active guest operating system running on the processor and a third hardware priority blocking register for storing a stored priority level corresponding to the active guest operating system, the interrupt package may be processed to block the first physical interrupt request if the first partition identifier matches the stored partition identifier retrieved from the first hardware register and the first priority value does not exceed the stored priority level retrieved from the third hardware register. Alternatively, the interrupt package may be processed to signal the first physical interrupt request to the targeted virtual processor if the first partition identifier matches the stored partition identifier retrieved from the first hardware register and the first priority value exceeds the stored priority level retrieved from the third hardware register. In any case, write access to the hardware registers at the processor may be restricted to the trusted hypervisor. By providing special purpose priority blocking registers at the processor, the interrupt package may be received as a prioritized first physical interrupt request from an interrupt controller which does not include any priority blocking circuits.

In another form, there is provided a method and apparatus for processing information in a data processing system having a processor and an interrupt controller. In operation, the interrupt controller processes pending partitioned interrupt requests to identify and present to the processor a first interrupt package for a first prioritized physical interrupt request that is not blocked, where the first interrupt package comprises a first priority value and a first partition identifier for the first prioritized physical interrupt request. At the processor, the first interrupt package is received and the first partition identifier from the first interrupt package is compared to at least a first stored partition identifier stored in a first hardware register at the processor to determine if the first prioritized physical interrupt request is directed to a partition at the processor. In particular, the first partition identifier may be compared to a guest partition identifier stored in the first hardware register to determine if the first prioritized physical interrupt request is directed to an active guest partition at the processor. If the first partition identifier matches the guest partition identifier, the first priority value may be compared to a guest priority level value stored in a guest priority hardware register at the processor to determine if the first prioritized physical interrupt request is blocked or forwarded. But if the first partition identifier does not match any guest partition identifier, the first priority value may be compared to a hypervisor priority level value stored in a hypervisor priority hardware register at the processor to determine if the first prioritized physical interrupt request is blocked or forwarded. In addition, the first priority value from the first interrupt package is compared to one or more priority level values stored in one or more priority hardware registers at the processor to determine if the first prioritized physical interrupt request is blocked or forwarded to a targeted virtual processor. If the first priority value does not exceed a priority level value stored in a priority hardware register corresponding to the first partition identifier from the first interrupt package, the first prioritized physical interrupt request is blocked. However, if the first priority value exceeds a priority level value stored in a priority hardware register corresponding to the first partition identifier from the first interrupt package, the first prioritized physical interrupt request is signaled to a targeted virtual processor corresponding to the first partition identifier from the first interrupt package. In selected embodiments, the first priority value is compared simultaneously to first and second priority level values stored, respectively, in a hypervisor priority hardware register and guest priority hardware register at the processor to determine if the first prioritized physical interrupt request is blocked or forwarded to a targeted virtual processor.

In yet another form, there is provided a data processing system and associated method of operation. The data processing system includes a partitioned interrupt controller for processing pending partitioned interrupt requests to identify prioritized interrupt requests that are not blocked. Each prioritized interrupt request is presented to a processor along with a priority value and a partition identifier for each presented prioritized interrupt request. A processor coupled to the partitioned interrupt controller includes one or more logical partition identifier registers, a hypervisor priority hardware register for storing a hypervisor priority level, and a guest priority hardware register for storing a guest priority level. The processor is configured to determine if the first prioritized physical interrupt request is blocked or forwarded to a targeted virtual processor by comparing the priority value against the guest priority level if the partition identifier matches against a logical partition identifier retrieved from the one or more logical partition identifier registers, and comparing the priority value against the hypervisor priority level if the partition identifier does not match a logical partition identifier retrieved from the one or more logical partition identifier registers. In selected embodiments, a guest operating system at the processor has write access to the guest priority hardware register for controlling blocking conditions for a guest partition without hypervisor intervention.

Although the described exemplary embodiments disclosed herein are directed to methods and systems for managing partitioned interrupt requests with a processor-based priority blocking mechanism and programming model, the present invention is not necessarily limited to the example embodiments illustrate herein, and various embodiments of the partitioned priority blocking circuitry and methods disclosed herein may be implemented with other circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "by," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:

1. A method of managing interrupts at a processor, comprising:
   receiving at the processor an interrupt package for a first physical interrupt request, where the interrupt package comprises a first priority value and a first partition identifier identifying a first partition; and
   processing the interrupt package against one or more partitions running on one or more targeted virtual processors at the processor by comparing the first priority value and first partition identifier against at least a stored priority level and stored partition identifier retrieved from one or more special purpose registers at the processor to determine on a partition basis if the first physical interrupt request is blocked or forwarded to a targeted virtual processor.

2. The method of claim 1, where the one or more special purpose registers at the processor comprise a first hardware register for storing a stored partition identifier corresponding to a hypervisor running on the processor.

3. The method of claim 2, where write access to the first hardware register at the processor is restricted to the hypervisor.

4. The method of claim 2, where the one or more special purpose registers at the processor comprise a second hardware priority blocking register for storing a stored priority level corresponding to the hypervisor.

5. The method of claim 4, where processing the interrupt package comprises blocking the first physical interrupt request if the first partition identifier does not match the stored partition identifier retrieved from the first hardware register and the first priority value does not exceed the stored priority level retrieved from the second hardware register.

6. The method of claim 4, where processing the interrupt package comprises signaling the first physical interrupt request to the targeted virtual processor if the first partition identifier does not match the stored partition identifier retrieved from the first hardware register and the first priority value exceeds the stored priority level retrieved from the second hardware register.

7. The method of claim 1, where the one or more special purpose registers at the processor comprise a first hardware register for storing a stored partition identifier corresponding to an active guest operating system running on the processor.

8. The method of claim 7, where the one or more special purpose registers comprise a third hardware priority blocking register for storing a stored priority level corresponding to the active guest operating system.

9. The method of claim 8, where processing the interrupt package comprises blocking the first physical interrupt request if the first partition identifier matches the stored partition identifier retrieved from the first hardware register and the first priority value does not exceed the stored priority level retrieved from the third hardware register.

10. The method of claim 8, where processing the interrupt package comprises signaling the first physical interrupt request to the targeted virtual processor if the first partition identifier matches the stored partition identifier retrieved from the first hardware register and the first priority value exceeds the stored priority level retrieved from the third hardware register.

11. The method of claim 1, where receiving the interrupt package for the first physical interrupt request comprises receiving the interrupt package for a prioritized first physical interrupt request from an interrupt controller which does not include any priority blocking circuits.

12. In a data processing system comprising a processor and an interrupt controller, a method comprising:
   processing a first plurality of pending partitioned interrupt requests at the interrupt controller to identify and present to the processor a first interrupt package for a first prioritized physical interrupt request that is not blocked, where the first interrupt package comprises a first priority value and a first partition identifier for the first prioritized physical interrupt request;
   receiving the first interrupt package at the processor;
   comparing the first partition identifier from the first interrupt package to at least a first stored partition identifier stored in a first hardware register at the processor to determine if the first prioritized physical interrupt request is directed to a partition at the processor; and
   comparing the first priority value from the first interrupt package to one or more priority level values stored in one or more priority hardware registers at the processor to determine if the first prioritized physical interrupt request is blocked or forwarded to a targeted virtual processor.

13. The method of claim 12, where comparing the first partition identifier comprises comparing the first partition identifier from the first interrupt package to a guest partition identifier stored in the first hardware register at the processor to determine if the first prioritized physical interrupt request is directed to an active guest partition at the processor.

14. The method of claim 13, where comparing the first priority value comprises comparing the first priority value from the first interrupt package to a guest priority level value stored in a guest priority hardware register at the processor if the first partition identifier matches the guest partition identifier stored in the first hardware register.

15. The method of claim 13, where comparing the first priority value comprises comparing the first priority value from the first interrupt package to a hypervisor priority level value stored in a hypervisor priority hardware register at the processor if the first partition identifier does not match any guest partition identifier stored in the first hardware register.

16. The method of claim 12, further comprising blocking the first prioritized physical interrupt request if the first priority value from the first interrupt package does not exceed a priority level value stored in a priority hardware register corresponding to the first partition identifier from the first interrupt package.

17. The method of claim 12, further comprising signaling the first prioritized physical interrupt request to a targeted virtual processor corresponding to the first partition identifier from the first interrupt package if the first priority value from the first interrupt package exceeds a priority level value stored in a priority hardware register corresponding to the first partition identifier from the first interrupt package.

18. The method of claim 12, where comparing the first priority value comprises comparing the first priority value from the first interrupt package simultaneously to first and second priority level values stored, respectively, in a hypervisor priority hardware register and guest priority hardware register at the processor to determine if the first prioritized physical interrupt request is blocked or forwarded to a targeted virtual processor.

19. A data processing system comprising:
a partitioned interrupt controller for processing a plurality of pending partitioned interrupt requests to identify and present prioritized interrupt requests that are not blocked, along with a priority value and a partition identifier for each presented prioritized interrupt request; and
a processor coupled to the partitioned interrupt controller comprising one or more logical partition identifier registers, a hypervisor priority hardware register for storing a hypervisor priority level, and a guest priority hardware register for storing a guest priority level, where the processor is configured to determine if the first prioritized physical interrupt request is blocked or forwarded to a targeted virtual processor by comparing the priority value against the guest priority level if the partition identifier matches against a logical partition identifier retrieved from the one or more logical partition identifier registers, and comparing the priority value against the hypervisor priority level if the partition identifier does not match a logical partition identifier retrieved from the one or more logical partition identifier registers.

20. The data processing system of claim 19, where a guest operating system at the processor has write access to the guest priority hardware register for controlling blocking conditions for a guest partition without hypervisor intervention.

* * * * *